United States Patent [19]

Aoki et al.

[11] Patent Number: 5,087,661
[45] Date of Patent: Feb. 11, 1992

[54] MOISTURE CURABLE POLYURETHANE COMPOSITION COMPRISING POLYALDIMINE

[75] Inventors: Masaaki Aoki; Masayuki Kamiyama; Hiroshi Honda, all of Kanagawa, Japan

[73] Assignee: Mitsui Toatsu Chemicals, Inc., Tokyo, Japan

[21] Appl. No.: 727,536

[22] Filed: Jul. 9, 1991

[30] Foreign Application Priority Data

Jul. 20, 1990 [JP] Japan .................. 65-190730
Aug. 21, 1990 [JP] Japan .................. 65-218120
Nov. 30, 1990 [JP] Japan .................. 65-336081

[51] Int. Cl.$^5$ ............................ C08K 5/16
[52] U.S. Cl. ........................... 524/714; 528/52
[58] Field of Search ................... 524/714; 528/52

[56] References Cited

U.S. PATENT DOCUMENTS

| | | | |
|---|---|---|---|
| 3,668,183 | 6/1972 | Hoy et al. | 528/335 |
| 3,835,191 | 9/1974 | Wagner et al. | 528/59 |
| 4,285,852 | 8/1981 | East | 528/194 |
| 4,299,743 | 11/1981 | Pierce et al. | 528/288 |
| 4,481,345 | 11/1984 | Nachtkamp et al. | 528/59 |
| 4,720,535 | 1/1988 | Schleier et al. | 528/59 |
| 4,853,454 | 8/1989 | Merger et al. | 528/59 |
| 5,010,161 | 4/1991 | Aoki et al. | 528/59 |

*Primary Examiner*—Morton Foelak
*Attorney, Agent, or Firm*—Burns, Doane, Swecker & Mathis

[57] ABSTRACT

A moisture curable polyurethane composition comprising a polyaldimine represented by the formula (I):

$$Y(-N=CH-X)_n \qquad (I)$$

wherein X is an aryl group having from 6 to 15 carbon atoms, Y is a divalent or trivalent hydrocarbon group having from 2 to 15 carbon atoms or a divalent or trivalent polyoxyalkylene group having a molecular weight of from 70 to 6000, and n is an integer of 2 or 3, and a polyisocyanate and/or a polyurethane prepolymer having 2 or more isocyanate groups; and a water proof material, flooring material, sealing material, wall covering material and paint comprising said composition and various fillers, are disclosed. The polyurethane composition has excellent storage stability and quick rate of curing in application.

24 Claims, No Drawings

MOISTURE CURABLE POLYURETHANE COMPOSITION COMPRISING POLYALDIMINE

BACKGROUND OF THE INVENTION

1. Field of the Invention

The present invention relates to a moisture curable polyurethane composition comprising polyaldimine which forms polyamine by hydrolysis, and a water proof material, flooring material, sealing material, wall covering material and paint comprising the composition.

2. Description of the Prior Art

Polyurethane resin is excellent in various properties such as rubber elasticity, abrasion resistance and service life, and thus has particularly been used in recent years for paints, flooring material, water proof materials, adhesives, wall covering materials and sealing materials.

The polyurethane resin is substantially classified into two groups, that is, one component type and two component type. In the one component type, terminal isocyanate groups of a polyurethane prepolymer cure by reaction with atmospheric moisture after application to an object in site. In the two component type, a principal component containing polyurethane prepolymer and a curing agent containing polyols are mixed at the time of application in site to cause cure.

One component type polyurethane can be used by anybody because of its readiness in application method and has recently been attracted much attention in particular.

The one component type polyurethane is referred to as moisture curable polyurethane and following compositions have conventionally been known in the art.

(1) Moisture curable polyurethane compositions by using a reaction of polyisocyanate with moisture (water), that is, a reaction wherein a part of isocyanate is converted to amine by the decarboxylation of an isocyanate-water reaction product and resultant amine reacts with remainder of the polyisocyanate to progress curing.

(2) Moisture curable polyurelthane compositions consisting of polyaldimine or polyketimine and polyisocyanate (British Patent 1064841 and German Patent 3607996A).

(3) Moisture curable polyurethane compositions consisting of polyenamine and polyisocyanate (British Patent 1575666 and German Patent 2125247).

The compositions (1), however, have disadvantages of markedly poor curing ability and generation of bubbles in the application in site, though relatively good in storage stability in a sealed vessel. Amine or tin catalysts may be incorporated in order to improve curing ability. These additives, however, lowers storage stability of the compositions or accelerates bubble formation and is hence unsuitable for practical use.

In the compositions (2), polyaldimine or polyketimine reacts with polyisocyanate during storage. Consequently, in order to cure the compositions (2) by atmospheric moisture after application in site, it is required to inhibit the above reaction by providing steric hindrance for polyaldimine or plyketimine or by blocking isocyanate groups.

British Patent 1064841 and German Patent 3607996A have disclosed polyaldimines having steric hindrance in the molecules. These aldimines, however, are prepared from aliphatic aldehydes and are unsuitable for practical use because of slow curing rate and poor storage stability.

Polyaldimine disclosed in German Patent 3607996A, in particular, is prepared from aromatic amines and is excellent in various physical properties such as mechanical strength. However, the compound has an disadvantage that curing rate is slow and storage stability is poor at increased temperatures.

In the compositions (3), polyenamine also reacts with polyisocyanate. Consequently, when aromatic isocyanate is used as polyisocyanate, isocyanate groups must be blocked similarly to polyketimine and hence the compositions are also unsuitable for practical use similarly to polyketimine. On the other hand, it has been known that polyisocyanates having relatively low-reactivity, for example, aliphatic polyisocyanates or alicyclic polyisocyanates can be used for sealing materials in combination with polyenamine. The system has characteristics of non-bubbling and rapid cure.

However, polyenamine reacts, though very gradually, with aliphatic or alicyclic polyisocyanate and leads to poor storage stability in a long period or in somewhat increased temperatures, even though stored in a sealed containers. As a result, the sealing materials containing such polyenamine have a disadvantage that initial physical properties of the sealing materials cannot be retained or viscosity is remarkably increased and leads to very poor workability. Consequently, any of conventionally known prior arts has been unsatisfactory. That is, very important properties of these types of polyurethane are good storage stability in the sealed containers, excellent mechanical strength in the initial period of application, good retention of initial physical properties during storage at increased temperatures, prevention of gelation, good stability in viscosity, quick, curing by atmospheric moisture, and no bubble formation. The level of these properties determines commodity value of polyurethane products.

In other words, it is strongly desired to develop a moisture curable polyurethane composition which is excellent in storage stability in the sealed containers, i.e., capable of being stored under constant viscosity for a long period, rapidly curable without bubble formation in the presence of moisture, and outstanding in mechanical strength after curing.

SUMMARY OF THE INVENTION

The present invention has been achieved to overcome the above described problems, and the object of the invention is to provide a moisture curable polyurethane composition which is excellent in storage stability for a long period, has good curing property, and can be used for various applications. Another object of the invention is to provide a water proof material, flooring material, sealing material, wall covering material and paint comprising the composition.

As a result of an intensive investigation in order to solve the above problems, the present inventors have found a method for hydrolyzing a polyaldimine which is derivertized from an aromatic aldehyde compound and the like with atmospheric moisture and completed the present invention. By using polyaldimine which is derivertized from an aromatic aldehyde compound and the like, the present invention can improve curing ability, mechanical strength, and storage stability of the moisture curable polyurethane composition. Thus various uses of the polyurethane composition can be developed.

That is, the aspect of the present invention is:
(1) a moisture curable polyurethane composition comprising a polyaldimine represented by the formula (I):

$$Y+N=CH-X)_n \qquad (I)$$

wherein X is an aryl group having from 6 to 15 carbon atoms, Y is a divalent or trivalent hydrocarbon group having from 2 to 15 carbon atoms, or a divalent or trivalent polyoxyalkylene group having a molecular weight of from 70 to 6000, and n is an integer of 2 or 3; and a polyisocyanate and/or a polyurethane prepolymer having 2 or more isocyanate groups, (2) the moisture curable polyurethane composition wherein Y is an amino residue derived from a di- or tri-amine having a melting point of 50° C. or less, (3) the moisture curable polyurethane composition wherein Y is an amino residue derived from an amine represented by the formula (II):

$$Z+CH_2NH_2)_n \qquad (II)$$

wherein Z is a divalent or trivalent cyclo-, bicyclo- or tricyclo-aliphatic hydrocarbon group having from 6 to 13 carbon atoms, and n is an integer of 2 or 3, and (4) the moisture curable polyurethane composition wherein Y is an amino residue derived from isophorone diamine, 1,3-bis(aminomethyl)cyclohexane and 2,5- or 2,6-bis(aminomethyl)bicyclo[2,2,1-]heptane.

Further aspect of the present invention is:
(5) a moisture curable polyurethane water proof material comprising the moisture curable polyurethane composition in one of the above (1) to (4) and a filler,
(6) a moisture curable polyurethane flooring material comprising the moisture curable polyurethane composition in one of the above (1) to (4) and a filler,
(7) a moisture curable polyurethane sealing material comprising the moisture curable polyurethane composition in one of the above (1) to (4) and a thixotropic agent,
(8) a moisture curable polyurethane wall covering material comprising the moisture curable polyurethane composition in one of the above (1) to (4) and a thixotropic agent, and
(9) a moisture curable polyurethane paint consisting of the moisture curable polyurethane composition in one of the above (1) to (4).

DETAILED DESCRIPTION OF THE INVENTION

The moisture curable polyurethane composition of the present invention comprises polyaldimine and polyisocyanate and/or polyurethane prepolymer having two or more isocyanate groups.

Polyaldimine for use in the invention is a compound represented by the formula (I)

$$Y+N=CH-X)_n \qquad (I)$$

wherein X is an aryl group having from 6 to 15 carbon atoms.

The aryl group represented by X is a phenyl group or a substituted phenyl group having one or more substituents. The substituents include an alkyl group having from 1 to 9 carbon atoms and an alkoxy group having from 1 to 9 carbon atoms.

The number of substitution on the above aryl group is preferably from 1 to 3. Exemplary aryl groups which are represented by X and preferably used include a phenyl group, methylphenyl group, ethylphenyl group, propylphenyl group, butylphenyl group, dimethylphenyl group, methoxyphenyl group, ethoxyphenyl group, and propoxyphenyl group. X may be the same or different in a molecule.

Y is a divalent or trivalent hydrocarbon group having from 2 to 15 carbon atoms, or a divalent or trivalent polyoxyalkylene group having a molecular weight of from 70 to 6000. n is an integer of 2 or 3. Preferred hydrocarbon group includes a divalent or trivalent alkyl group, cycloalkyl group, and aryl group. The alkyl group is preferably a straight chain alkyl having from 4 to 8 carbon atoms or a branched chain alkyl having from 4 to 10 carbon atoms. The cycloalkyl group which can be used is from 1 to 3 cyclic groups having from 5 to 12 carbon atoms per ring. The ring may have substituents. The aryl group is a phenyl group and substituted phenyl group having from 1 to 3 substituents. Exemplary substituents include alkyl groups having from 1 to 9 carbon atoms.

The divalent polyoxyalkylene group is a group derived from polyoxyalkylene glycols obtained by addition polymerization of propylene oxide and/or ethylene oxide to water, ethylene glycol or propylene glycol.

The trivalent polyoxyalkylene group is a group derived from polyoxyalkylene triols obtained by addition polymerization of propylene oxide and/or ethylene oxide to glycerol or trimethylolpropane.

The divalent or trivalent polyoxyalkylene group has a molecular weight of preferably from 70 to 6000. The molecular weight less than 70 is unsuitable for practical use. When the molecular weight exceeds 6000, the composition leads to decreased physical properties after curing.

The polyaldimine represented by the formula (I) can be prepared with ease by reacting polyamine with aldehyde.

Exemplary polyamine includes 1) alipahtic diamines such as ethylenediamine, 1,3-diaminopropane, tetramethylenediamine, hexamethylenediamine, heptamethylenediamine, octamethylenediamine and decamethylenediamine; alicyclic diamines such as 4,4,-diaminodicyclohexylmethane, isophoronediamine, bisaminomethylcyclohexane, 2,5- or 2,6-diaminomethylbicyclo[2.2.1]heptane, diaminocyclohexane, and 3(4), 8(9)-bis(aminomethyl)tricyclo[5.2.1.0$^{2,6}$]decane; aromatic diamines such as diaminodiphenylmethane, diaminodiphenyl ether, xylylenediamine, phenylenediamine, and 3,5-diethyltoluene-2,4 or 2,6-diamine; diamines such as polyoxyalkylenediamine obtained by conducting addition polymerization of propylene oxide and/or ethylene oxide to water, ethylene glycol or propylene glycol and by converting the hydroxyl group of resulting polyoxyalkylene glycol to an amino group, 2) triamines such as 1,3,5-tris(aminomethyl)benzene, 1,3,5-tris(aminomethyl)cyclohexane, and polyoxyalkylenetriamine obtained by conducting addition polymerization of propylene oxide and/or ethylene oxide to glycerol and trimethylolpropane and by converting the hydroxyl group of resulting polyoxyalkylene triol to an amino group.

In these amine compounds, low melting point polyamines having a melting point of 50° C. or less are preferred in particular. Polyaldimine prepared from high melting point polyamines is a solid and difficult to handle in some cases.

Preferred low melting point polyamines include, for example, ethylenediamine, 1,3-diaminopropane, tetramethylenediamine, hexamethylenediamine, isophoronediamine, bisaminomethylcyclohexane, 2,5- or 2,6-diaminomethylbicyclo[2.2.1]heptane, xylylenediamine, diaminocyclohexane, 3,5-diethyltoluene-2,4- or 2,6-diamine, 1,3,5-tris(aminomethyl)cyclohexane, 3(4),8(9)-bis(aminomethyl)-tricyclo[5.2.1.02,6]decane, and polyoxyalkylenepolyamine.

The aldehydes which can preferably react with these polyamines include, for example, benzaldehyde, o-tolualdehyde, m-tolualdehyde, p-tolualdehyde, 4-ethylbenzaldehyde, 4-propylbenzaldehyde, 4-butylbenzaldehyde, 2,4-dimethylbenzaldehyde, 2,4,5-trimethylbenzaldehyde, p-anisaldehyde and p-ethoxybenzaldehyde.

Following processes are preferred for the preparation of polyaldimine.

For example, the above described polyamine and the aldehyde are heated to allow dehydration reaction in a solvent such as toluene or xylene in the presence of an acid catalyst, and water generated by the reaction is distilled out azeotropically. Polyaldimine is obtained by continuing the reaction until distillation of water into the water separator is terminated. The mixing proportion of the polyamine and the aldehyde is preferably from 1 to 2 equivalent of the aldehyde per equivalent of the amine. The reaction is usually conducted for several hours. After finishing the reaction aldehyde and solvent are distilled off from the reaction mixture under reduced pressure to obtain polyaldimine.

The present invention constitutes the moisture curable polyurethane composition by mixing the above polyaldimine with polyisocyanate and/or the polyurethane prepolymer having two or more isocyanate groups.

The polyisocyanate is a compound having two or more isocyanate groups in a molecule. Preferred polyisocyanate generally contains from 2 to 5 isocyanate groups in a molecule.

Such type of polyisocyanate compound preferably has two or more isocyanate groups bonded to an alkylene group, cycloalkylene group or phenylene group.

Exemplary polyisocyanate compounds include 1) tolylene diisocyanate including various mixtures of isomers, diphenylmethane diisocyanate including various mixtures of isomers, 3,3'-dimethyl-4,4'-biphenylene diisocyante, 1,4-phenylene diisocyanate, xylylene diisocyanate, tetramethylxylylene diisocyanate, naphthylene diisocyanate, dicyclohexylmethane-4,4'-diisocyanate, isophorone diisocyanate, hexamethylene diisocyanate, hydrogenated xylylene diisocyanate, 1,4-cyclohexyl diisocyanate, 1-methyl-2,4-diisocyanatocyclohexane, 2,4,4-trimethyl-1,6-diisocyanatohexane and other diisocyanates; 2) 4,4',4''-triphenylmethane triisocyanate, tris(4-phenylisocyanato) thiophosphate and other triisocyanates; and 3) urethane modified polyisocyanate, isocyanurate modified polyisocyanate, carbodiimide modified polyisocyanate, biuret modified polyisocyanate of the above polyisocyanate compounds, crude tolylene diisocyanate, polymethylenepolyphenyl isocyanate and other multifunctional isocyanates.

The polyurethane prepolymer which has a plurality of isocyanate groups and can be used for the invention is prepared by reacting the above organic polyisocyanate compound with a known polyol, known polyamine and other known compounds having two or more active hydrogen in a molecule. Free isocyanate groups are remained in the polyurethane prepolymer.

The known compounds having two or more active hydrogen in a molecule has two or more hydroxyl groups, one or more amino groups, two or more mercapto groups, hydroxyl and amino groups, or hydroxyl and mercapto groups. Representative known compounds include, for example, water, ethylene glycol, propylene glycol, glycerol, trimethylolpropane, pentaerythritol, sorbitol, sucrose and other polyhydric alcohols; aniline, tolylene diamine, p,p'-diaminodiphenylemthane and other aromatic amines; ethylenediamine and other aliphatic amines; and ethanolamine, diethanolamine and other alkanolamines.

The known compounds also includes polyetherpolyols obtained by conducting addition polymerization of propylene oxide or propylene oxide and ethylene oxide to these compounds or a mixture of these compounds; and polyetherpolyamines obtained by converting the hydroxyl groups of the polyetherpolyols to amine groups.

The known compounds further includes polytetramethyleneether polyols, polycarbonate polyols, polycaprolactone polyols, polyester polyols such as polyethylene adipate, polybutadiene polyols, higher fatty acid esters such as castor oil, polymer polyols obtained by grafting vinyl monomers on polyether polyol or polyester polyols, compounds obtained by copolymerizing known ethylenically unsaturated monomers having one or more active hydrogen in a molecule, and ethers having mercapto groups.

The polyurethane prepolymer is prepared by reacting the polyisocyanate at 100° C. for several hours with the known compound having active hydrogen. The prepolymer has an isocyanate content of preferably from 0.5 to 20.0% by weight.

The moisture curable polyurethane composition of the invention can be prepared by mixing the polyaldimin with the polyisocyanate and/or the polyurethane prepolymer containing the isocyanate groups.

The ratio of the number of amino groups in the polyamine formed by the hydrolysis of polyaldimine to the number of isocyanate groups contained in the above described polyisocyanate and/or the polyurethane prepolymer having the isocyanate groups is from 0.5 to 2.0, preferably from 0.7 to 1.5.

The moisture curable polyurethane composition of the present invention which is prepared by the above described process can be employed as intact for various uses such as sealing materials, water proof materials, flooring materials, wall covering materials, paints and adhesives.

Further, in order to control viscosity, resin properties and service life depending upon the uses, below described fillers, thixotropic agents, plasticizers, solvents, adhesion improvers, colorants, stabilizers and catalysts for curing acceleration can be incorporated to the moisture curable polyurethane composition of the invention.

For example, in the preparation of water proof materials and flooring materials, fillers are preferably added to the moisture curable polyurethane composition consisting of the above polyaldeimine and the above polyisocyanate and/or the polyurethane prepolymer having isocyanate groups.

Useful fillers include, for example, calcium carbonate, talc, kaolin, aluminum sulfate, zeolite, diatomaceous earth, polyvinyl chloride paste resin, glass balloon and polyvinylidene chloride resin balloon. The fillers are used in the range of 60% by weight or less, preferably from 20 to 60% by weight of the composition.

In the case of preparing the sealing materials and wall covering materials, thixotropic agents are preferably added to the moisture curable polyurethane composition consisting of the above polyaldimine and the above polyisocyanate and/or the polyurethane prepolymer having isocyanate groups.

Exemplary thixotropic agents which can be used for the invention include colloidal silica, fatty acid amide wax, aluminum stearate, surface treated bentonite, polyethylene short fiber, and phenol resin short fiber. The thixotropic agents are blended in the range of from 0.2 to 15% by weight, preferably from 0.5 to 10% by weight of the composition.

Representative plasticizers for use in the invention include, for example, dioctyl phthalate, dibutyl phthalate, dilauryl phthalate, butyl benzyl phthalate, dioctyl adipate, diisodecyl adipate, diisodecyl phthalate and trioctyl phosphate. The plasticizers can be blended in the range of 50% by weight or less, preferably from 0 to 40% by weight of the composition.

Suitable solvents for use in the invention include, for example, aromatic hydrocarbons such as toluene and xylene; aliphatic hdyrocarbons such as hexane, heptane and octane; petroleum base solvents from gasoline to kerosene; esters such as ethyl acetate and butyl acetate; kketones such as acetone, methyl ethyl ketone and methyl isobutyl ketone; and ether esters such as cellosolve acetate and butyl cellosolve acetate. The solvents can be used in the range of 50% by weight or less, preferably from 0 to 40% by weight of the composition.

Exemplary adhesion improvers which can be preferably used in the invention include known silane coupling agents. The adhesion improvers can be used in the range of 5% by weight or less, preferably from 0.05 to 2% by weight of the composition.

Carbon black, titanium white, chromium oxide, iron oxide red and other colorants can be blended in the range of preferably from 0.1 to 5% by weight of the composition. Hindered phenol compounds, triazol compounds and other stabilizers can be added in the range of from 0.1 to 2% by weight of the composition.

Further, catalysts for curing acceleration can also be blended in the polyurethane composition of this invention. Preferred curing acceleration catalysts include carboxylic acid, sulfonic acid, phosphoric acid and phosphate ester. The amount of these catalysts is in the rang of preferably from 0.05 to 5% by weight of the composition.

No particular restriction is imposed on the method of blending these components. Simple mixing or mixing by other known methods can be arbitrarily carried out. For example, the filler, plasticizer, thixotropic agent and other necessary additives are blended in a mixer such as a planetary mixer or a dissolver. Then the organic polyisocyanate and/or the prepolymer having isocyanate groups and polyaldimine are added into the mixer and thoroughly mixed.

When the additives have high moisture content, these additives must previously be dehydrated or addition of a dehydrating agent such as zeolite is required.

The moisture curable polyurethane composition thus obtained can be used immediately, or can also be stored by packing in a sealed container under a nitrogen atmosphere. In such a case, the composition has very good storage stability in the sealed container under conditions isolated from atmospheric moisture and has high retention of physical properties and good stability of viscosity even though stored at increased temperatures. On the other hand, when the seal is once broken, the composition is rapidly cured by exposing to the atmospheric moisture. Poreless solid polyurethane products having excellent mechanical strengths can thus be obtained, which property is quite different from conventional, moisture curable polyurethane.

The moisture curable polyurethane composition of the invention is excellent in curing ability and also in storage stability for a long period. The composition provides sealing materials, wall covering materials, water proof materials, flooring materials, paints and adhesives by blending fillers, thixotropic agents and other additives depending upon the object for use. These materials have also excellent storage stability and workability, and can be rapidly cured by atmospheric moisture on application in site. Further, the cured products have high modulus and excellent strength.

EXAMPLE

In the examples, part illustrates part by weight.

Synthesis Example 1

(Preparation of dialdimine ALD-1)

To a reaction vessel equipped with a stirrer, thermometer, dropping funnel and water separator, 88 parts (2.0 equivalents) of tetramethylenediamine, 0.1 part of formic acid and 500 parts of toluene were charged and mixed at room temperature in a nitrogen atmosphere. After 10 minutes, 300 parts (2.5 equivalents) of p-tolualdehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted p-tolualdehyde.

The residual reaction product ALD-1 was 290 parts.

The IR absorption spectrum of the reaction product thus obtained had a characteristic absorption band of $-N=CH-$ at 1640 cm$^{-1}$.

Dialdimine ALD-1 was a light yellow liquid at room temperature and had an amine value of 381 mgKOH/g.

Synthesis Example 2

(Preparation of dialdimine ALD-2)

To a reaction vessel equipped with a stirrer, thermometer, dropping funnel and water separator, 116 parts (2.0 equivalents) of hexamethyleneidamine, 0.1 part of formic acid and 500 parts of toluene were charged and mixed at room temperature in a nitrogen atmosphere. After 10 minutes, 265 parts (2.5 equivalents) of benzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted benzaldehyde.

The residual reaction product ALD-2 was 290 parts.

The IR absorption spectrum of the reaction product thus obtained had a characteristic absorption band of —N=CH— at 1640 cm$^{-1}$.

Dialdimine ALD-2 was a light yellow liquid at room temperature and had an amine value of 381 mgKOH/g.

Synthesis Example 3

(Preparation of dialdimine ALD-3)

To a reaction vessel equipped with a stirrer, thermometer, dropping funnel and water separator, 154 parts (2.0 equivalents) of diamiomethylbicyclo[2.2.1-]heptane which is a mixture of 60% 2,5-isomer and 40% 2,6-isomer, 0.1 part of formic acid and 500 parts of toluene were charged and mixed at room temperature in a nitrogen atmosphere. After 10 minutes, 265 parts (2.5 equivalents) of benzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted benzaldehyde.

The residual reaction product ALD-3 was 328 parts.

The IR absorption spectrum of the reaction product thus obtained had a characteristic absorption band of —N=CH— at 1640 cm$^{-1}$.

Dialdimine ALD-3 was a light yellow liquid at room temperature and had an amine value of 337 mgKOH/g.

Synthesis Example 4

(Preparation of dialdimine ALD-4)

To a reaction vessel equipped with a stirrer, thermometer, dropping funnel and water separator, 154 parts (2.0 equivalents) of diaminomethylbicyclo[2.2.1-]heptane which is a mixture of 60% 2,5-isomer and 40% 2,6-isomer, 0.1 part of formic acid and 500 parts of toluene were charged and mixed at room temperature in a nitrogen atmosphere. After 10 minutes, 300 parts (2.5 equivalents) of p-tolualdehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted p-tolualdehyde.

The residual reaction product ALD-4 was 354 parts.

The IR absorption spectrum of the reaction product thus obtained had a characteristic absorption band of —N=CH— at 1640 cm$^{-1}$.

Dialdimine ALD-4 was a light yellow liquid at room temperature and had an amine value of 310 mgKOH/g.

Synthesis Example 5

(Preparation of dialdimine ALD-5)

To a reaction vessel equipped with a stirrer, thermometer, dropping funnel and water separator, 154 parts (2.0 equivalents) of diaminomethylbicyclo[2.2.1-]heptane which is a mixture of 60% 2,5-isomer and 40% 2,6-isomer, 0.1 part of formic acid and 500 parts of toluene were charged and mixed at room temperature in a nitrogen atmosphere. After 10 minutes, 335 parts (2.5 equivalents) of 4-ethylbenzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted 4-ethylbenzaldehyde.

The residual reaction product ALD-5 was 382 parts.

The IR absorption spectrum of the reaction product thus obtained had a characteristic absorption band of —N=CH— at 1640 cm$^{-1}$.

Dialdimine ALD-5 was a light yellow liquid at room temperature and had an amine value of 285 mgKOH/g.

Synthesis Example 6

(Preparation of dialdimine ALD-6)

To a reaction vessel equipped with a stirrer, thermometer, dropping funnel and water separator, 154 parts (2.0 equivalents) of diaminomethylbicyclo[2.2.1-]heptane which is a mixture of 60% 2,5-isomer and 40% 2,6-isomer, 0.1 part of formic acid and 500 parts of toluene were charged and mixed at room temperature in a nitrogen atmosphere. After 10 minutes, 340 parts (2.5 equivalents) of p-anisaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mmHg with a vacuum pump to distill off toluene and unreacted p-anisaldehyde.

The residual reaction product ALD-6 was 383 parts.

The IR absorption spectrum of the reaction product thus obtained had a characteristic absorption band of —N=CH— at 1640 cm$^{-1}$.

Dialdimine ALD-6 was a light yellow liquid at room temperature and had an amine value of 286 mgKOH/g.

Synthesis Example 7

(Preparation of dialdimine ALD-7)

To a reaction vessel equipped with a stirrer, thermometer, dropping funnel and water separator, 170 parts (2.0 equivalents) of isophoronediamine, 0.1 part of formic acid and 500 parts of toluene were charged and mixed at room temperature in a nitrogen atmosphere. After 10 minutes, 265 parts (2.5 equivalents) of benzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mmHg with a vacuum pump to distill off toluene and unreacted benzaldehyde.

The residual reaction product ALD-7 was 343 parts.

The IR absorption spectrum of the reaction product thus obtained had a characteristic absorption band of —N=CH— at 1640 cm$^{-1}$.

Dialdimine ALD-7 was a light yellow liquid at room temperature and had an amine value of 320 mgKOH/g.

Synthesis Example 8

(preparation of dialdimine ALD-8)

To a reaction vessel equipped with a stirrer, thermometer, dropping funnel and water separator, 170 parts (2.0 equivalents) of isophoronediamine, 0.1 part of formic acid and 500 parts of toluene were charged and mixed at room temperature in a nitrogen atmosphere. After 10 minutes, 300 parts (2.5 equivalents) of m-tolualdehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted m-tolualdehyde.

The residual reaction product ALD-8 was 372 parts.

The IR absorption spectrum of the reaction product thus obtained had a characteristic absorption band of —N=CH— at 1640 cm$^{-1}$.

Dialdimine ALD-8 was a light yellow liquid at room temperature and had an amine value of 297 mgKOH/g.

Synthesis Example 9

(Preparation of dialdimine ALD-9)

To a reaction vessel equipped with a stirrer, thermometer, dropping funnel and water separator, 142 parts (2.0 equivalents) of bisaminomethylcyclohexane, 0.1 parts of formic acid and 500 parts of toluene were charged and mixed at room temperature in a nitrogen atmosphere. After 10 minutes, 335 parts (2.5 equivalents) of 4-ethylbenzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted 4-ethylbenzaldehyde.

The residual reaction product ALD-9 was 371 parts.

The IR absorption spectrum of the reaction product thus obtained had a characteristic absorption band of —N=CH— at 1640 cm$^{-1}$.

Dialdimine ALD-9 was a light yellow liquid at room temperature and had an amine value of 297 mgKOH/g.

Synthesis Example 10

(Preparation of dialdimine ALD-10)

To a reaction vessel equipped with a stirrer, thermometer, dropping funnel and water separator, 210 parts (2.0 equivalents) of 4,4'-diaminodicyclohexylmethane, 0.1 part of formic acid and 500 parts of toluene were charged and mixed at room temperature in a nitrogen atmosphere. After 10 minutes, 300 parts (2.5 equivalents) of p-tolualdehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted p-tolualdehyde.

The residual reaction product ALD-10 was 410 parts.

The IR absorption spectrum of the reaction product thus obtained had a characteristic absorption band of —N=CH— at 1640 cm$^{-1}$.

Dialdimine ALD-10 was a light yellow solid at room temperature and had an amine value of 268 mg KOH/g.

Synthesis Example 11

(Preparation of dialdimine ALD-11)

To a reaction vessel equipped with a stirrer, thermometer, dropping funnel and water separator, 178 parts (2.0 equivalents) of 3,5-diethyltoluene-2,4 and 2,6-diamine which is a mixture of 80% 2,4-isomer and 20% 2,6-isomer, 0.1 part of formic acid and 500 parts of toluene were charged and mixed at room temperature in a nitrogen atmosphere. After 10 minutes, 265 parts (2.5 equivalents) of benzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted benzaldehyde.

The residual reaction product ALD-11 was 351 parts.

The IR absorption spectrum of the reaction product thus obtained had a characteristic absorption band of —N=CH— at 1640 cm$^{-1}$.

Dialdimine ALD-11 was a light yellow liquid at room temperature and had an amine value of 315 mgKOH/g.

Synthesis Example 12

(Preparation of trialdimine ALD-12)

To a reaction vessel equipped with a stirrer, thermometer, dropping funnel and water separator, 114 parts (2.0 equivalents) of 1,3,5-tris(aminomethyl)cyclohexane, 0.1 part of formic acid and 500 parts of toluene were charged and mixed at room temperature in a nitrogen atmosphere. After 10 minutes, 265 parts (2.5 equivalents) of benzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted benzaldehyde.

The residual reaction product ALD-12 was 299 parts.

The IR absorption spectrum of the reaction product thus obtained had a characteristic absorption band of $-N=CH-$ at 1640 cm$^{-1}$.

Trialdimine ALD-12 was a light yellow liquid at room temperature and had an amine value of 386 mgKOH/g.

Synthesis Example 13

(Preparation of dialdimine ALD-13)

To a reaction vessel equipped with a stirrer, thermometer, dropping funnel and water separator, 148 parts (2.0 equivalents) of polyoxyethylenediamine JEFFAMINE EDR-148 (Trade mark of Texaco Chemical Company, Molecular Weight 148), 0.1 part of formic acid and 500 parts of toluene were charged and mixed at room temperature in a nitrogen atmosphere. After 10 minutes, 405 parts (2.5 equivalents) of p-isobutylbenzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

in the next step, outside temperature of the reaction vessel was set at 150° C. Successively, internal pressure of the reaction vessel was reduced to 1 mm Hg with a vacuum pump to distill off toluene and unreacted p-isobutylbenzaldehyde.

The residual reaction product ALD-13 was 435 parts.

The IR absorption spectrum of the reaction product thus obtained had a characteristic absorption band of $-N=CH-$ at 1640 cm$^{-1}$.

Dialdimine ALD-13 was a light yellow liquid at room temperature and had an amine value of 257 mg KOH/g.

Synthesis Example 14

(Preparation of dialdimine ALD-14)

To a reaction vessel equipped with a stirrer, thermometer, dropping funnel and water separator, 230 parts (2.0 equivalents) of polyoxypropylenediamine JEF-FAMINE D-230 (Trade mark of Texaco Chemical Company, Molecular Weight 230), 0.1 part of formic acid and 500 parts of toluene were charged and mixed at room temperature in a nitrogen atmosphere. After 10 minutes, 340 parts (2.5 equivalents) of p-anisaldehyde wer added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted p-anisaldehyde.

The residual reaction product ALD-14 was 464 parts.

The IR absorption spectrum of the reaction product thus obtained had a characteristic absorption band of $-N=CH-$ at 1640 cm$^{-1}$.

Dialdimine ALD-14 was a light yellow liquid at room temperature and had an amine value of 241 mgKOH/g.

Synthesis Example 15

(Preparation of trialdimine ALD-15)

To a reaction vessel equipped with a stirrer, thermometer, dropping funnel and water separator, 294 parts (2.0 equivalents) of polyoxypropylenetriamine JEFFAMINE T-403 (Trade mark of Texaco Chemical Company, Molecular Weight 440), 0.1 part of formic acid and 500 parts of toluene were charged and mixed at room temperature in a nitrogen atmosphere. After 10 minutes, 370 parts (2.5 equivalents) by p-isopropylbenzaldehyde were added dropwise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 36 parts.

In the next step, outside temperature of the reaction vessel was set at 150° C. Successively, internal pressure of the reaction vessel was reduced to 1 mm Hg with a vacuum pump to distill off toluene and unreacted p-isopropylbenzaldehyde.

The residual reaction product ALD-15 was 552 parts.

The IR absorption spectrum of the reaction product thus obtained had a characteristic absorption band of $-N=CH-$ at 1640 cm$^{-1}$.

Trialdimine ALD-15 was a light yellow liquid at room temperature and had an amine value of 304 mgKOH/g.

Synthesis Example 16

(Preparation of trialdimine ALD-16)

To a reaction vessel equipped with a stirrer thermometer, dropping funnel and water separator, 2000 parts (1.2 equivalents) of polyoxypropylenetriamine JEFFAMINE T-5000 (Trade mark of Texaco Chemical Company, Molecular Weight 5000), 0.5 part of formic acid and 2000 parts of toluene were charged and mixed at room temperature in a nitrogen atmosphere. After 10 minutes, 159 parts (1.5 equivalents) of benzaldehyde were added drop-wise from the dropping funnel over 30 minutes. Successively, the mixture was heated and reflux was started at about 90° C. and separation of water was observed in the water separator. Thereafter the reaction was continued under reflux for 6 hours until water distillation was terminated. The amount of distilled water was 21 parts.

In the next step, outside temperature of the reaction vessel was set at 150° C. Successively, internal pressure of the reaction vessel was reduced to 1 mm Hg with a vacuum pump to distill off toluene and unreacted benzaldehyde.

The residual reaction product ALD-16 was 2103 parts.

The IR absorption spectrum of the reaction product thus obtained had a characteristic absorption band of —N=CH— at 1640 cm$^{-1}$.

Trialdimine ALD-16 was a light yellow liquid at room temperature and had an amine value of 32 mgKOH/g.

Example 1

A mixture composed of 54 parts of ALD-2 and 100 parts of biuret modified hexamethylene polyisocyanate, OLESTER NP-1000 (Trade mark of Mitsui Toatsu Chemicals), having a NCO content of 17% by weight was sealed and stored at 50° C. for 30 days. After storage, it was found that the properties of the mixture had undergone little change.

After storage, the mixture was applied to a glass plate with a thickness of 0.5 mm and allowed to stand at 25° C. under relative humidity of 50%. The surface was cured after 1.5 hours.

OLESTER NP-1000 alone was treated by the same procedures as above. No surface curing wa observed after 24.

Example 2

A mixture composed of 20 parts of ALD-3, 70 parts of dioctyl phthalate and 200 parts of polyoxypropyleneglycol (PPG)/tolylene diisocyanate (TD1) base prepolymer, HIPRENE P-305 (Trade mark of Mitsui Toatsu Chemicals), having a NCO content of 2.8% by weight was sealed and stored at 50° C. for 30 days. No change was observed after storage on the properties.

After storage, the mixture was applied to a glass plate with a thickness of 0.5 mm and allowed to stand at 25° C. under relative humidity of 50%. The surface was cured after 1.5 hours.

HIPRENE P-305 alone was treated by the same procedures as above. No surface curing was observed after 10 hours.

Example 3

A mixture composed of 89 parts of ALD-11 and 200 parts of TD1-trimethylolpropane adduct, OLESTER P45-75S (Trade mark of Mitsui Toatsu Chemicals), having a NCO content of 11.6% by weight was sealed and stored at 50° C. for 30 days. No change was observed after storage on the properties.

After storage, the mixture was applied to a glass plate with a thickness of 0.5 mm and allowed to stand at 25° C. under relative humidity of 50%. The surface was cured after 3 hours.

OLESTER P-45-75S alone was treated by the same procedures as above. No surface curing was observed after 10 hours.

Example 4

A mixture composed of 220 parts of ALD-16 and 50 parts of TD1-trimethylolpropane adduct, OLESTER P45-75S (Trade mark of Mitsui Toatsu Chemicals), having a NCO content of 11.6% by weight was sealed and stored at 50° C. for 30 days. No change was observed after storage on the properties.

After storage, the mixture was applied to a glass plate with a thickness of 0.5 mm and allowed to stand at 25° C. under relative humidity of 50%. The surface was cured after 3 hours.

OLESTER P-45-75S alone was treated by the same procedures as above. No surface curing was observed after 10 hours.

(Examples and comparative examples on moisture curable polyurethane water proof materials)

In Examples 5-10, the moisture curable polyurethane water proof materials were prepared and evaluated.

Curability was evaluated by measuring tack free time in accordance with JIS-A5758 (1986), Items 6-10.

Storage stability was evaluated by measuring viscosity change with a type B rotational viscometer after storing the moisture curable polyurethane water proof material for a prescribed period under sealed condition.

Mechanical strengths of cured water proof material after application in site were measured in accordance with JIS-K6301. That is, the sample was allowed to stand after application for 7 days at 23° C. under relative humidity of 50%, and further allowed to stand at 50° C. for 7 days. Thereafter 100% tensile modulus, tensile strength and elongation at break were measured.

Formulations and evaluation results are illustrated in Table 1. For the purpose of comparison, formulations and evaluation results of Comparative Examples 1 and 2 are also illustrated in Table 1.

Example 5

Following raw materials were used.

Dialdimine ... ALD-1 which was prepared in Synthesis Example 1.

Polyurethane prepolymer having isocyanate groups ... A prepolymer obtained by reacting 598 parts of 2,4-tolylene diisocyanate with 2600 parts of polyoxypropylene glycol having a molecular weight of 2000 and 1802 parts of polyoxypropylene triol having a molecular weight of 3000 for 10 hours at 100° C. The prepolymer had a NCO content of 1.89% by weight and viscosity of 41000 cps/25° C.

To a 3λ planetary mixer, 200 parts of dioctyl phthalate, 600 parts of calcium carbonate, 50 parts of titanium dioxide and 10 parts of weathering stabilizer, IRGANOX-1010 (Trade mark of Ciba Geigy), were charged and kneaded for 15 minutes at the room temperature and successively kneaded at 100° C. for an hour under vacuum dehydration. Thereafter 700 parts of the prepolymer and 42 parts of dialdimine (ALD-1) were added and kneaded for 15 minutes at the room temperature. To the mixture obtained, 10 parts of antisettling agent, HYDROPHOBIC SILICA #R-972 (Trade mark of Japan Aerosil) and 150 parts of toluene were added and kneaded for 10 minutes at room temperature under vacuum to obtain a moisture curable polyurethane water proof material of the invention.

The water proof material had a short tack free time and excellent curability as illustrated in Table 1.

The viscosity was retained satisfactory for practical use after storage under sealed condition at 50° C. for 14 days. After curing by moisture, the cured product had no bubble formation and was excellent in physical properties.

Example 6

The same procedures as described in Example 5 were carried out except that 48 parts of dialdimine (ALD-3) prepared in Synthesis Example 3 were used.

The water proof material had a short tack free time and excellent curability as illustrated in Table 1.

The viscosity was retained satisfactory for practical use after storage under sealed condition at 50 ° C. for 14 days. After curing by moisture, the cured product had no bubble formation and was excellent in physical properties.

Example 7

The same procedures as described in Example 5 were carried out except that 52 parts of dialdimine (ALD-4) prepared in Synthesis Example 4 were used.

The water proof material had a short tack free time and excellent curability as illustrated in Table 1.

The viscosity was retained satisfactory for practical use after storage under sealed condition at 50° C. for 14 days. After curing by moisture, the cured product had no bubble formation and was excellent in physical properties.

Example 8

The same procedures as described in Example 5 were carried out except that 56 parts of dialdimine (ALD-5) prepared in Synthesis Example 5 were used.

The water proof material had a short tack free time and excellent curability as illustrated in Table 1.

The viscosity was retained satisfactory for practical use after storage under sealed condition at 50° C. for 14 days. After curing by moisture, the cured product had no bubble formation and was excellent in physical properties.

Example 9

The same procedures as described in Example 5 were carried out except that 50 parts of dialdimine (ALD-7) prepared in Synthesis example 7 were used.

The water proof material had a short tack free time and excellent curability as illustrated in Table 1.

The viscosity was retained satisfactory for practical use after storage under sealed condition at 50° C. for 14 days.

After curing by moisture, the cured product had no bubble formation and was excellent in physical properties.

Example 10

The same procedures as described in Example 5 were carried out except that 67 parts of dialdimine (ALD-14) prepared in Synthesis Example 14 were used.

The water proof material had a short tack free time and excellent curability as illustrated in Table 1.

The viscosity was retained satisfactory for practical use after storage under sealed condition at 50° C. for 14 days.

After curing by moisture, the cured product had no bubble formation and was excellent in physical properties. Further, the compositions prepared in Examples 5-10 maintained properties required for the moisture curable polyurethane flooring material.

Comparative Example 1

Polyaldimine (ALD-17) having an amine value of 299 mgKOH/g was prepared by carrying out the same procedures as described in Synthesis Example 1 except that polymeric methylenedianiline, Aromatic Polyamine MDA-150 (manufactured by Mitsui Toatsu Chemicals), was used as amine and trimethylacetaldehyde was used as aldehyde.

The same procedures as described in Example 5 were carried out except that 54 parts of the above aldimine (ALD-17) were used.

The water proof material thus obtained had a long tack free time and curability was poor as illustrated in Table 1.

Comparative Example 2

The same procedures as described in Example 5 were carried out except that dialdimine was not used.

The water proof material thus obtained had a very long tack free time and curability was extremely poor as illustrated in Table 1.

After curing by moisture, the cured product generated bubbles, had inferior mechanical properties and impaired commodity value of water proof material.

(Examples and Comparative examples of the moisture curable polyurethane sealing materials)

The moisture curable polyurethane sealing materials were prepared and evaluated in the below described Examples 11-16.

Curability was evaluated by measuring tack free time in accordance with JIS A-5758 (1986), Items 6-10.

Storage stability was evaluated by storing the moisture curable polyurethane sealing material under sealed condition for a prescribed period and thereafter measuring penetration at one second and 5 seconds [$10^{-1}$mm] in accordance with JIS-K2808 (1961). Mechanical properties of sealing material cured after application were measured in accordance with JIS-K6301. That is, the sample was allowed to stand after application for 7 days at 23° C. under relative humidity of 50%, and further allowed to stand at 50° C. for 7 days. Thereafter 100% tensile modulus, tensile strength and elongation at break were measured.

Formulations and evaluation results are illustrated in Table 2. For the purpose of comparison, formulations and evaluation results of Comparative Examples 3 and 4 are illustrated in Table 2.

Example 11

Following raw materials were used.
Dialdimine ... ALD-3 which was prepared in Synthesis Example 3.
Polyurethane prepolymer having isocyanate groups ... The prepolymer used in Example 5.

To a 3λ planetary mixer, 390 parts of dioctyl phthalate, 450 parts of calcium carbonate, 50 parts of titanium dioxide and 10 parts of weathering stabilizer, IRGANOX-1010 (Trade mark of Ciba Geigy), were charged and kneaded for 15 minutes at the room temperature and successively kneaded at 100° C. for an hour under vacuum dehydration. Thereafter 800 parts of the prepolymer and 54 parts of dialdimine (ALD-3) were added and kneaded for 15 minutes at the room temperature. To the mixture obtained, 100 parts of a thixotropic agent, Hydrophobic Silica #R-972 (manufactured by Japan Aerosil), and 170 parts of toluene were added and kneaded for 10 minutes at the room temperature under vacuum to obtain a moisture curable polyurethane sealing material of the invention.

As illustrated in Table 2, the sealing material has a shorter tack free time and excellent curability as compared with a sealing material prepared without using aldimine. The sealing material obtained had good workability after storing under sealed condition at 50° C. for 14 days. The sealing material cured after application had no bubble formation and was excellent in physical properties.

Example 12

The same procedures as described in Example 11 were carried out except that 64 parts of dialdimine (ALD-6) prepared in Synthesis Example 6 were used.

The sealing material obtained had a short tack free time and excellent curability as illustrated in Table 2. Workability of the sealing material was good after storing under sealed condition at 50° C. for 14 days. The sealing material cured after application had no bubble formation and was excellent in physical properties.

Example 13

The same procedures as described in Example 11 were carried out except that 62 parts of dialdimine (ALD-8) prepared in Synthesis Example 8 were used.

The sealing material obtained had a shorter tack free time and excellent curability as illustrated in Table 2. Workability of the sealing material was good after storing under sealed condition at 50° C. for 14 days. The sealing material cured after application had no bubble formation and was excellent in physical properties.

Example 14

The same procedures as described in Example 11 were carried out except that 62 parts of dialdimine (ALD-9) prepared in Synthesis Example 9 were used.

The sealing material obtained had a shorter tack free time and excellent curability as illustrated in Table 2. Workability of the sealing material was good after storing under sealed condition at 50° C. for 14 days. The sealing material cured after application had no bubble formation and was excellent in physical properties.

Example 15

The same procedures as described in Example 11 were carried out except that 68 parts of dialdimine (ALD-10) prepared in Synthesis Example 10 were used.

The sealing material obtained had a short tack free time and excellent curability as illustrated in Table 2. Workability of the sealing material was good after storing under sealed condition at 50° C. for 14 days. The sealing material cured after application had no bubble formation and was excellent in physical properties.

Example 16

The same procedures as described in Example 11 were carried out except that 71 parts of dialdimine (ALD-13) prepared in Synthesis Example 13 were used.

The sealing material obtained had a short tack free time and excellent curability as illustrated in Table 2. Workability of the sealing material was good after storing under sealed condition at 50° C. for 14 days. The sealing material cured after application had no bubble formation and was excellent in physical properties.

Further, the compositions prepared in Examples 11–16 maintained properties required for the moisture curable polyurethane wall covering material.

Comparative Example 3

Dialdimine (ALD-18) having an amine value of 441 mgKOH/g was prepared by carrying out the same procedures as described in Synthesis Example 1 except that hexamethylenediamine was used as amine and trimethylacetaldehyde was used as aldehyde.

The same procedures as described in Example 11 were carried out except that 42 parts of the above aldimine (ALD-18) were used.

The sealing material thus obtained had very poor storage stability as illustrated in Table 2.

Comparative Example 4

The same procedures as described in Example 11 were carried out without using dialdimine. The sealing material thus obtained had very long tack free time as illustrated in Table 2 and extremely poor curability. The material cured by moisture generated bubbles and hence had inferior mechanical properties.

In addition, water proof materials and sealing materials were prepared in the above examples. The same formulations as in these examples can also be applied as intact to the preparation of flooring materials and wall covering materials. Curing procedures of these materials are also the same. Consequently, description of examples are omitted.

(Examples and comparative examples of moisture curable polyurethane paints)

Moisture curable polyurethane paints were prepared and evaluated in Examples 17 and 18 described below.

Curability was evaluated by measuring a tack free time in accordance with JIS A-5758(1986). Items 6–10.

Storage stability was evaluated by storing the moisture curable polyurethane paint under sealed condition for a prescribed period and thereafter measuring viscosity change with a type B rotational viscometer.

Mechanical properties of the paint cured after application were measured in accordance with JIS-K6301. That is, the sample was allowed to stand after application for 7 days at 23° C. under relative humidity of 50%, and further allowed to stand at 50° C. for 7 days. Thereafter, 100% tensile modulus, tensile strength and elongation at break were measured.

Formulations and evaluation results are illustrated in Table 3. For the purpose of comparison, formulations and evaluation results of Comparative Example 5 are also illustrated in Table 3.

Example 17

Following raw materials were used.

Trialdimine ... ALD-12 which was prepared in Synthesis Example 12.

Polyurethane prepolymer terminated by isocyanate groups ... An adduct or toiyiene diisocyanate and polyoxytetramethylele glycol, HIPRENE L-167 (Trade mark of Mitsui Toatsu Chemicals), having an NCO content of 6.4%.

To a 3 λ flask, 1000 parts of the prepolymer, parts of trialdimine (ALD-12), 600 parts of xylene and 20 parts of a thixotropic agent, Hydrophobic silica #R-972 (manufactured by Japan Aerosil), were charged and stirred for an hour at the room temperature to obtain the moisture curable polyurethane paint of the invention.

The paint thus obtained had a short tack free time and excellent curability as illustrated in Table 3. The paint maintained satisfactory viscosity for practical use after storing under sealed condition at 50° C. for 14 days. The paint cured by moisture had no bubble and was excellent in physical properties.

Example 18

The same procedures as described in Example 17 were carried out except that 256 parts of trialdimine (ALD-15) prepared in Synthesis Example 15 were used.

The paint thus obtained had a short tack free time and excellent curability as illustrated in Table 3. The paint maintained satisfactory viscosity for practical use after storing under sealed condition at 50° C. for 14 days. The paint cured by moisture had no bubble and was excellent in physical properties.

Comparative Example 5

Trialdimine (ALD-19) having an amine value of 447 mgKOH/g was prepared by carrying out the same procedures as described in Synthesis Example 1 except that 1,3,5-tris(aminomethyl)cyclohexane was used as amine and trimethylacetaldehyde was used as aldehyde.

The same procedures as described in Example 17 were carried out except that 174 parts of the above trialdimine (ALD-19) were used.

The paint thus obtained was very poor in storage stability a illustrated in Table 3.

TABLE 1

|  | Example |  |  |  |  |  | Comparative Example |  |
|---|---|---|---|---|---|---|---|---|
|  | 5 | 6 | 7 | 8 | 9 | 10 | 1 | 2 |
| Formulation (part) | | | | | | | | |
| Calcium carbonate | 600 | ← | ← | ← | ← | ← | ← | ← |
| Titanium dioxide | 50 | ← | ← | ← | ← | ← | ← | ← |
| DOP | 200 | ← | ← | ← | ← | ← | ← | ← |
| Prepolymer | 700 | ← | ← | ← | ← | ← | ← | ← |
| AEROSIL R 972 | 10 | ← | ← | ← | ← | ← | ← | ← |
| Toluene | 150 | ← | ← | ← | ← | ← | ← | ← |
| IRGANOX-1010 | 10 | ← | ← | ← | ← | ← | ← | ← |
| ALD-1 | 42 | | | | | | | |
| ALD-3 | | 48 | | | | | | |
| ALD-4 | | | 52 | | | | | |
| ALD-5 | | | | 56 | | | | |
| ALD-7 | | | | | 50 | | | |
| ALD-14 | | | | | | 67 | | |
| ALD-17 | | | | | | | 54 | |
| Storage stability | | | | | | | | |
| (23° C. × 14 days) | | | | | | | | |
| Tack free time (hr) | 1.5 | 1.5 | 1.5 | 1.5 | 1.5 | 1.5 | 5 | 24< |
| Viscosity (ps/25° C.) | 22 | 23 | 23 | 24 | 25 | 22 | 26 | 25 |
| 100% modulus (kg/cm$^2$) | 11.2 | 12.0 | 11.8 | 11.5 | 11.6 | 10.9 | 14.6 | 5.3 |
| Tensile strength (kg/cm$^2$) | 34.6 | 36.4 | 36.0 | 35.8 | 36.0 | 32.3 | 35.1 | 27.6 |
| Elongation (%) | 570 | 530 | 550 | 550 | 550 | 590 | 320 | 1020 |
| Bubble formation | no | no | no | no | no | no | no | found |
| (50° C. × 14 days) | | | | | | | | |
| Tack free time (hr) | 1.5 | 1.5 | 1.5 | 1.5 | 1.5 | 1.5 | 5 | 24< |
| Viscosity (ps/25° C.) | 32 | 30 | 30 | 31 | 33 | 32 | 33 | 30 |
| 100% modulus (kg/cm$^2$) | 9.5 | 10.0 | 9.8 | 9.6 | 9.8 | 9.4 | 10.5 | 5.0 |
| Tensile strength (kg/cm$^2$) | 26.8 | 29.7 | 28.6 | 27.1 | 28.2 | 26.2 | 23.3 | 25.5 |
| Elongation (%) | 510 | 490 | 500 | 500 | 500 | 530 | 270 | 1170 |
| Bubble formation | no | no | no | no | no | no | no | found |

TABLE 2

|  | Example |  |  |  |  |  | Comparative Example |  |
|---|---|---|---|---|---|---|---|---|
|  | 11 | 12 | 13 | 14 | 15 | 16 | 3 | 4 |
| Formulation (part) | | | | | | | | |
| Calcium carbonate | 450 | ← | ← | ← | ← | ← | ← | ← |
| Titanium dioxide | 50 | ← | ← | ← | ← | ← | ← | ← |
| DOP | 390 | ← | ← | ← | ← | ← | ← | ← |
| Prepolymer | 800 | ← | ← | ← | ← | ← | ← | ← |
| AEROSIL R 972 | 100 | ← | ← | ← | ← | ← | ← | ← |
| Toluene | 170 | ← | ← | ← | ← | ← | ← | ← |
| IRGANOX-1010 | 10 | ← | ← | ← | ← | ← | ← | ← |
| ALD-3 | 54 | | | | | | | |
| ALD-6 | | 64 | | | | | | |
| ALD-8 | | | 62 | | | | | |
| ALD-9 | | | | 62 | | | | |
| ALD-10 | | | | | 68 | | | |
| ALD-13 | | | | | | 71 | | |
| ALD-18 | | | | | | | 42 | |
| Curability | 1 | 1 | 1 | 1 | 1 | 1 | 0.5 | 24< |
| Tack free time (hr) | | | | | | | | |
| Storage stability | | | | | | | | |
| Penetration (10$^{-1}$ mm) | | | | | | | | |
| At preparation 1 sec. | SO* | SO | SO | SO | SO | SO | 250 | SO |
| 5 sec. | SO | SO | SO | SO | SO | SO | 370 | SO |
| After 50° C. × 14 days | | | | | | | | |
| 1 sec. | 200 | 190 | 210 | 210 | 180 | 210 | gel | 230 |
| 5 sec. | 320 | 310 | 330 | 330 | 300 | 330 | | 370 |
| Physical property | | | | | | | | |
| 100% modulus (kg/cm$^2$) | 5.6 | 5.2 | 5.1 | 5.2 | 5.5 | 5.0 | 5.3 | 3.2 |
| Tensile strength (kg/cm$^2$) | 39.6 | 38.1 | 38.2 | 38.7 | 39.8 | 38.1 | 38.6 | 29.3 |
| Elongation (%) | 920 | 980 | 1010 | 970 | 980 | 1000 | 980 | 1180 |

TABLE 2-continued

|  | Example | | | | | | Comparative Example | |
|---|---|---|---|---|---|---|---|---|
|  | 11 | 12 | 13 | 14 | 15 | 16 | 3 | 4 |
| Bubble formation | no | no | no | no | no | no | no | found |

Note:
*SO indicates penetration of 420 or more.

TABLE 3

|  | Example | | Comparative Example |
|---|---|---|---|
|  | 17 | 18 | 5 |
| Formulation (part) | | | |
| Prepolymer | 1000 | ← | ← |
| Xylene | 600 | ← | ← |
| AEROSIL R 972 | 20 | ← | ← |
| ALD-12 | 201 | | |
| ALD-15 | | 256 | |
| ALD-19 | | | 174 |
| Curability | 1.5 | 1.5 | 1 |
| Tack free time (hr) | | | |
| Storage stability | | | |
| Viscosity (cps/25° C.) | | | |
| After 23° C. × 14 days | 1000 | 810 | 790 |
| After 50° C. × 14 days | 1300 | 1050 | gel |
| Physical property | | | |
| 100% modulus (kg/cm$^2$) | 75 | 70 | 75 |
| Tensile strength (kg/cm$^2$) | 317 | 292 | 305 |
| Elongation (%) | 410 | 450 | 410 |
| Bubble formation | no | no | no |

What is claimed is:

1. A moisture curable polyurethane composition comprising a polyaldimine represented by the formula (I):

$$Y(-N=CH-X)_n \quad (I)$$

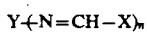

wherein X is an aryl group having from 6 to 15 carbon atoms, Y is a divalent or trivalent hydrocarbon group having from 2 to 15 carbon atoms, or a divalent or trivalent polyoxyalkylene group having a molecular weight of from 70 to 6000, and n is an integer of 2 or 3; and a polyisocyanate and/or a polyurethane prepolymer having 2 or more isocyanate groups.

2. The moisture curable polyurethane composition of claim 1 wherein Y is an amino residue derived from a di-or tri-amine having a melting point of 50° C. or less.

3. The moisture curable polyurethane composition of claim 1 wherein Y is an amino residue derived from an amine represented by the formula (II):

$$X(-CH_2NH_2)_n \quad (II)$$

wherein Z is a divalent or trivalent cyclo-, bicyclo-, or tricyclo-aliphatic hydrocarbon group having from 6 to 13 carbon atoms, and n is an integer of 2 or 3.

4. The moisture curable polyurethane composition of claim 1 wherein Y is an amino residue derived from isophorone diamine, 1,3-bis(aminomethyl)cyclohexane, or 2,5-or 2,6-bis(aminomethyl)bicyclo[2.2.1]heptane.

5. A moisture curable polyurethane water proof material comprising the moisture curable polyurethane composition in claim 4 and a filler.

6. A moisture curable polyurethane flooring material comprising the moisture curable polyurethane composition in claim 4 and a filler.

7. A moisture curable polyurethane sealing material comprising the moisture curable polyurethane composition in claim 4 and a thixotropic agent.

8. A moisture curable polyurethane wall covering material comprising the moisture curable polyurethane composition in claim 4 and a thixotropic agent.

9. A moisture curable polyurethane paint comprising the moisture curable polyurethane composition in claim 4.

10. A moisture curable polyurethane water proof material comprising the moisture curable polyurethane composition in claim 1 and a filler.

11. A moisture curable polyurethane water proof material comprising the moisture curable polyurethane composition in claim 2 and a filler.

12. A moisture curable polyurethane water proof material comprising the moisture curable polyurethane composition in claim 3 and a filler.

13. A moisture curable polyurethane water flooring material comprising the moisture curable polyurethane composition in claim 1 and a filler.

14. A moisture curable polyurethane water flooring material comprising the moisture curable polyurethane composition in claim 2 and a filler.

15. A moisture curable polyurethane water flooring material comprising the moisture curable polyurethane composition in claim 3 and a filler.

16. A moisture curable polyurethane water sealing material comprising the moisture curable polyurethane composition in claim 1 and a thixotropic agent.

17. A moisture curable polyurethane water sealing material comprising the moisture curable polyurethane composition in claim 2 and a thixotropic agent.

18. A moisture curable polyurethane water sealing material comprising the moisture curable polyurethane composition in claim 3 and a thixotropic agent.

19. A moisture curable polyurethane wall covering material comprising the moisture curable polyurethane composition in claim 1 and a thixotropic agent.

20. A moisture curable polyurethane wall covering material comprising the moisture curable polyurethane composition in claim 2 and a thixotropic agent.

21. A moisture curable polyurethane wall covering material comprising the moisture curable polyurethane composition in claim 3 and a thixotropic agent.

22. A moisture curable polyurethane paint comprising the moisture curable polyurethane composition in claim 1.

23. A moisture curable polyurethane paint comprising the moisture curable polyurethane composition in claim 2.

24. A moisture curable polyurethane paint comprising the moisture curable polyurethane composition in claim 3.

* * * * *